United States Patent Office 3,591,439
Patented July 6, 1971

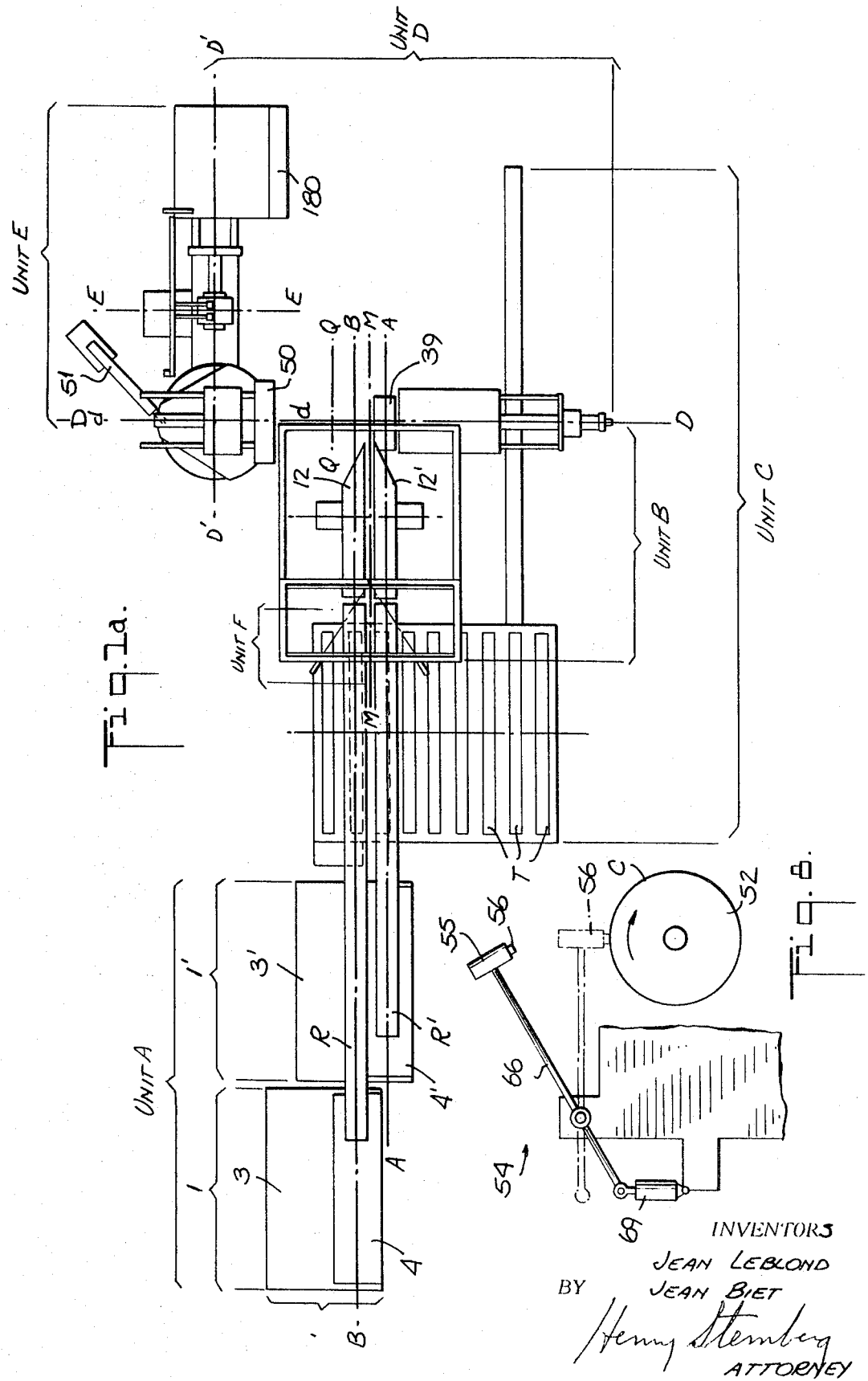

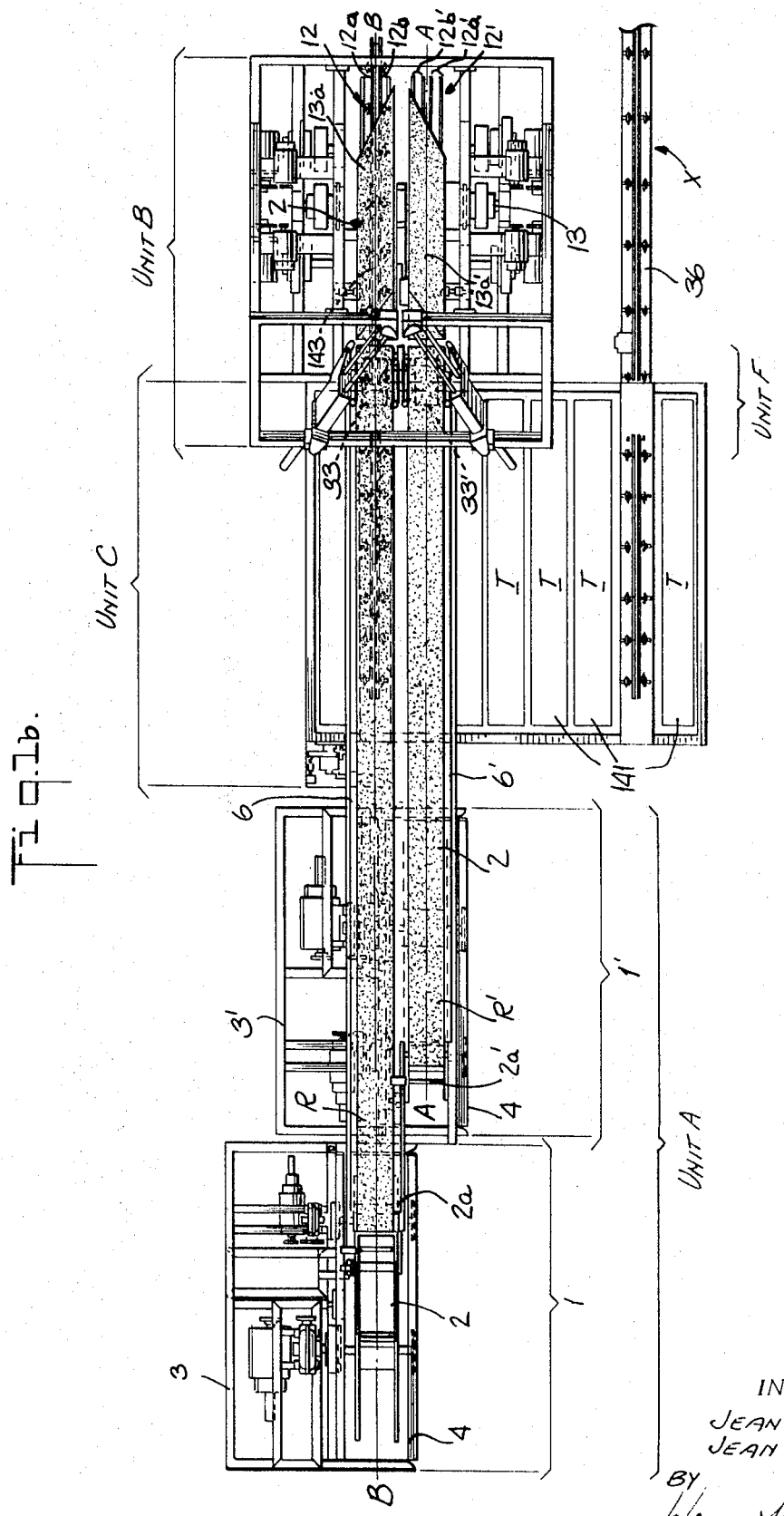

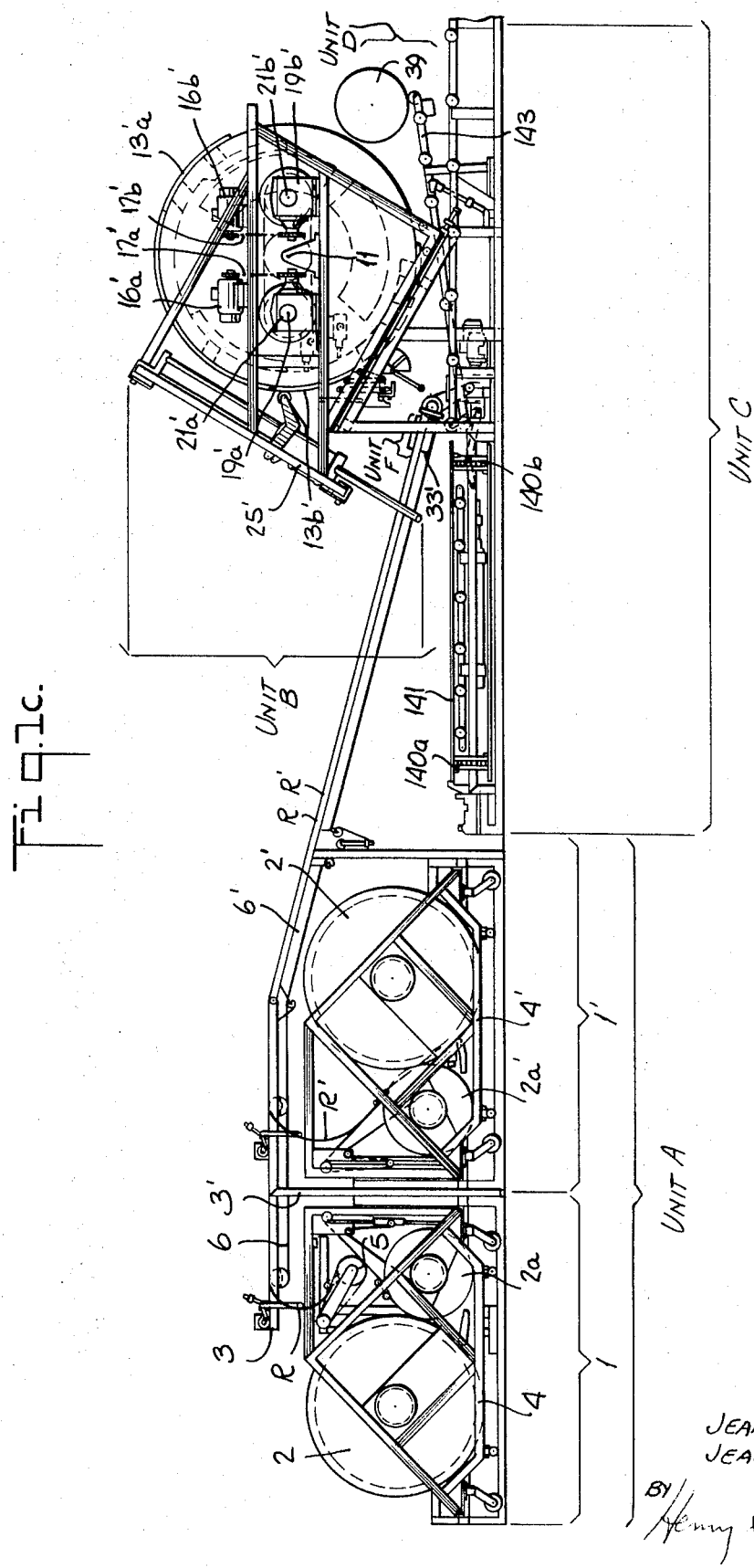

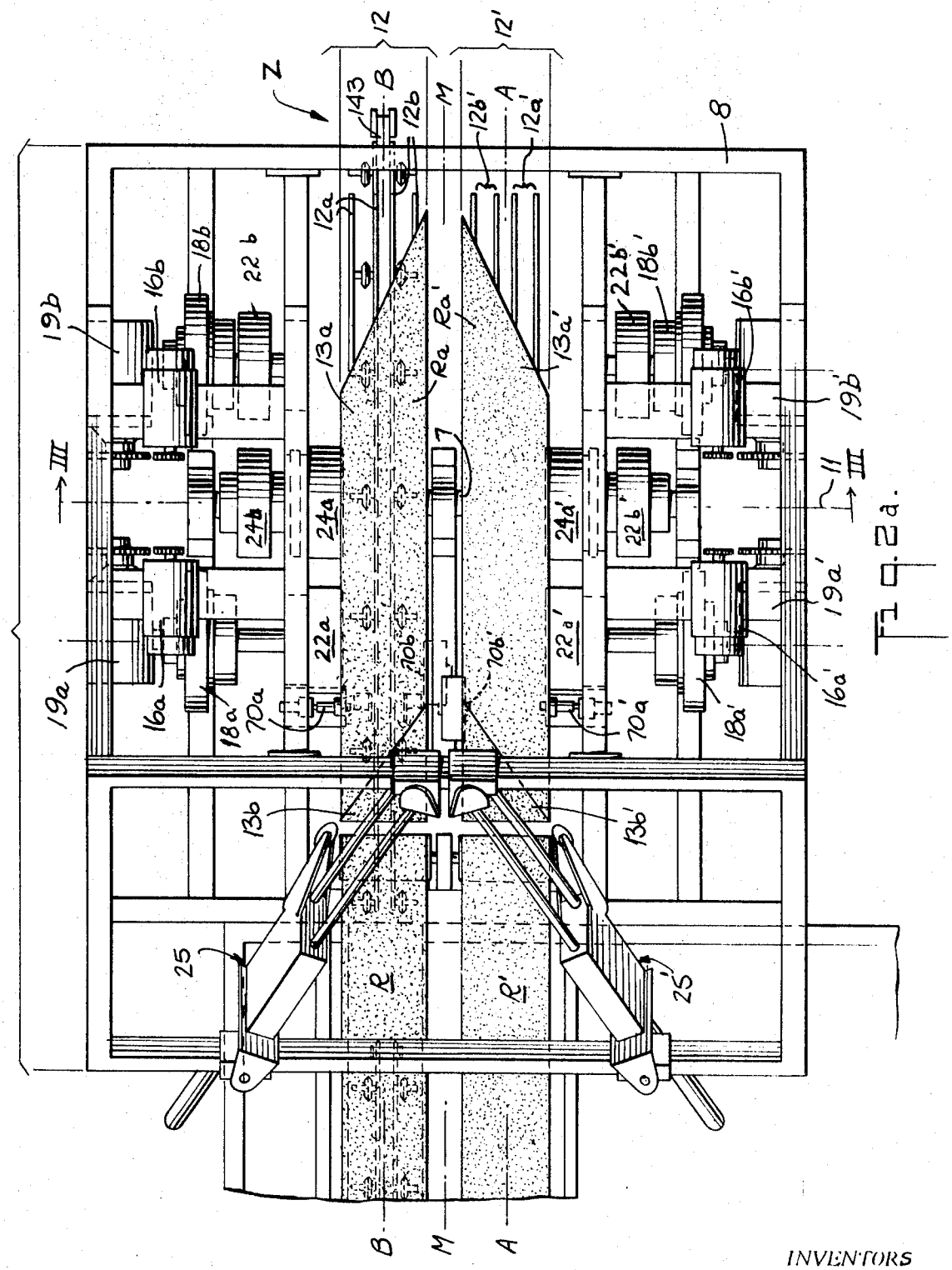

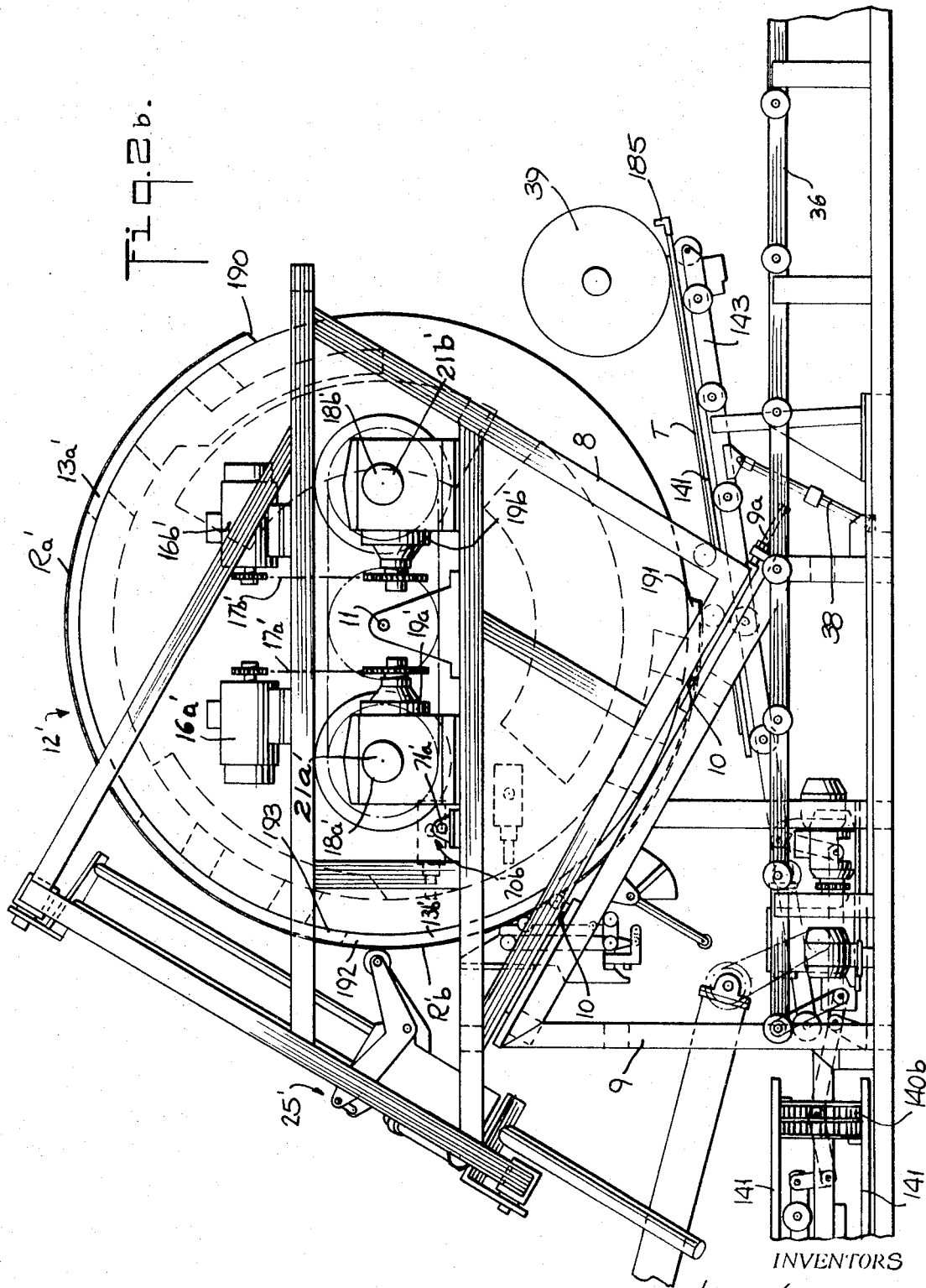

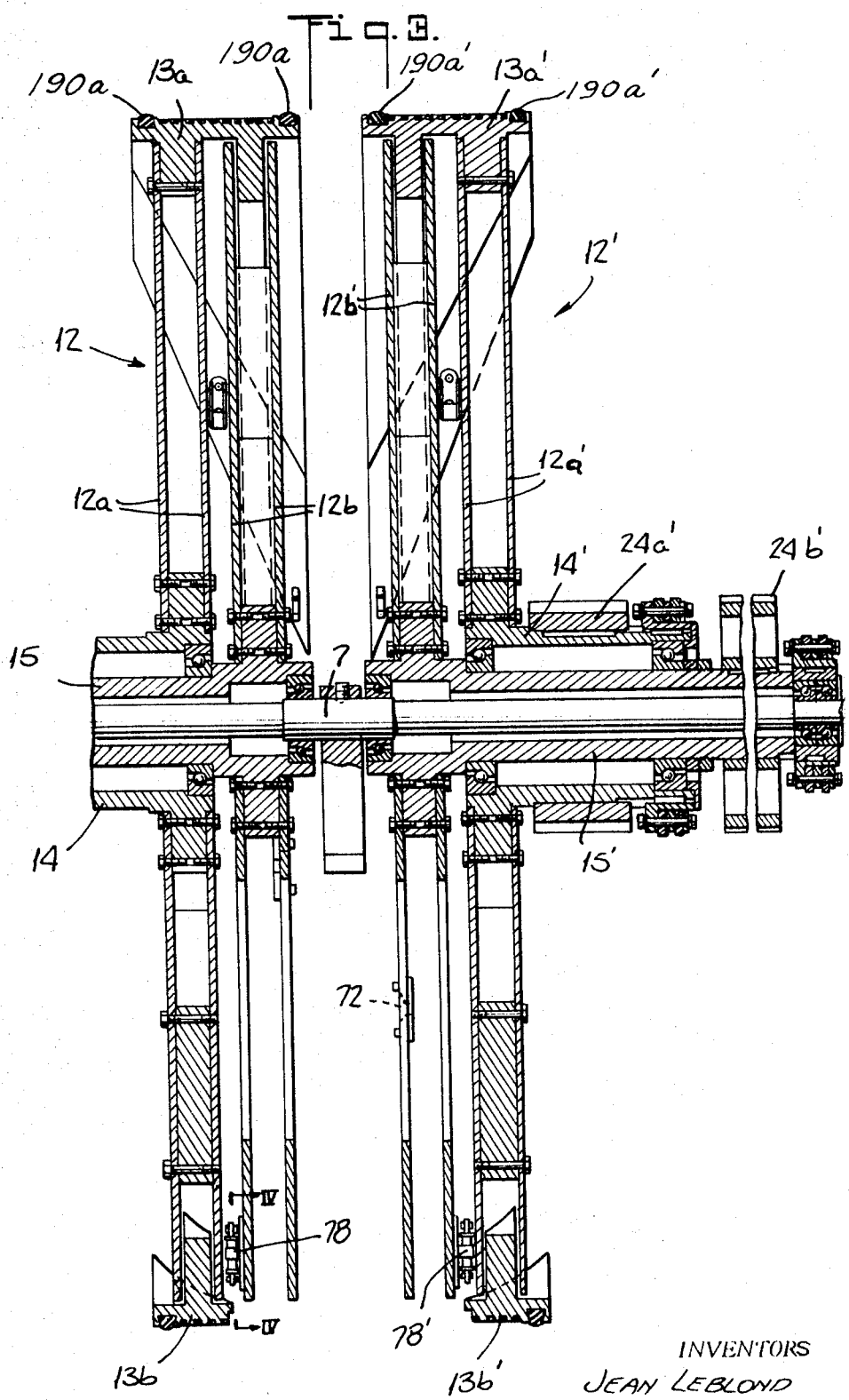

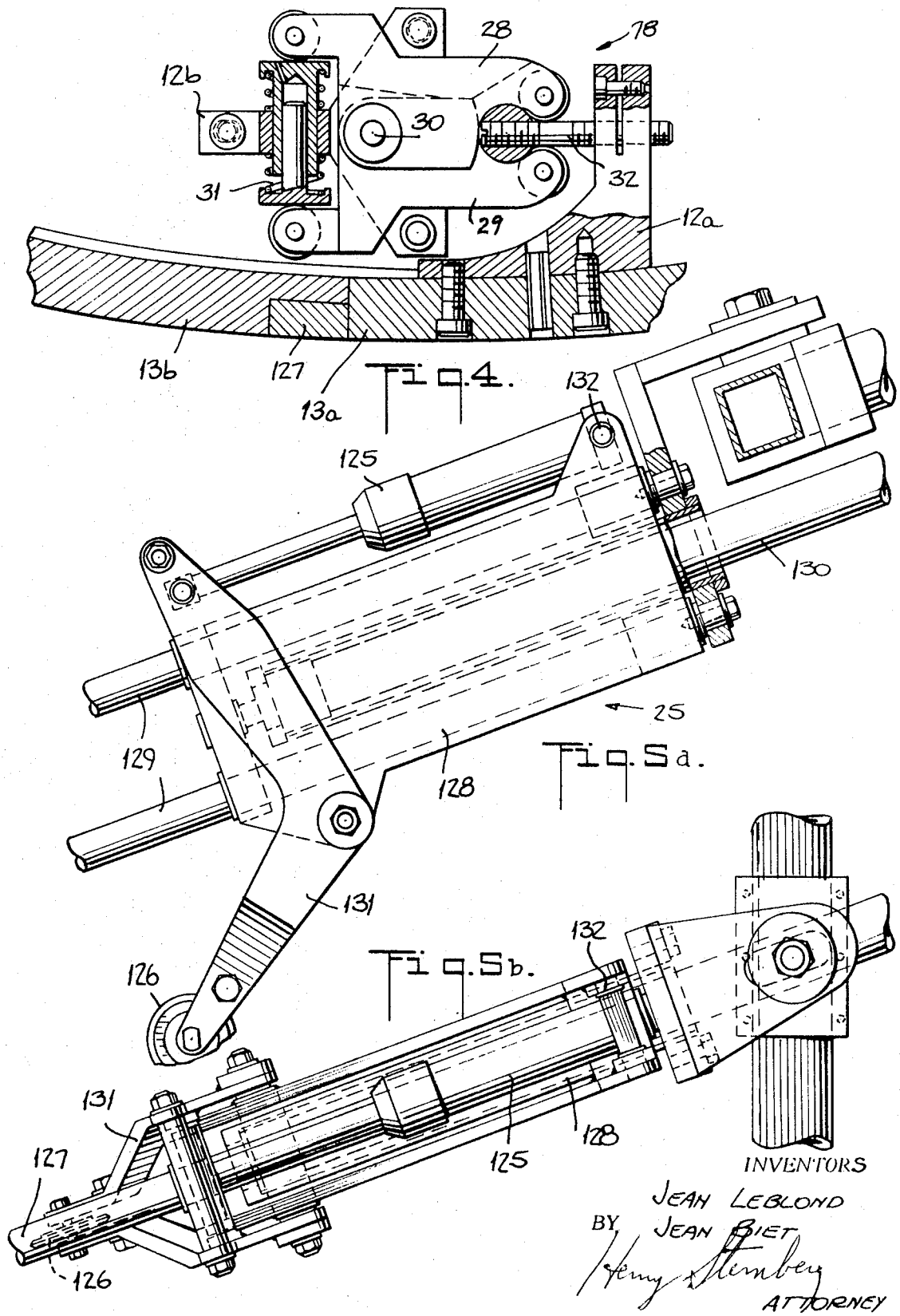

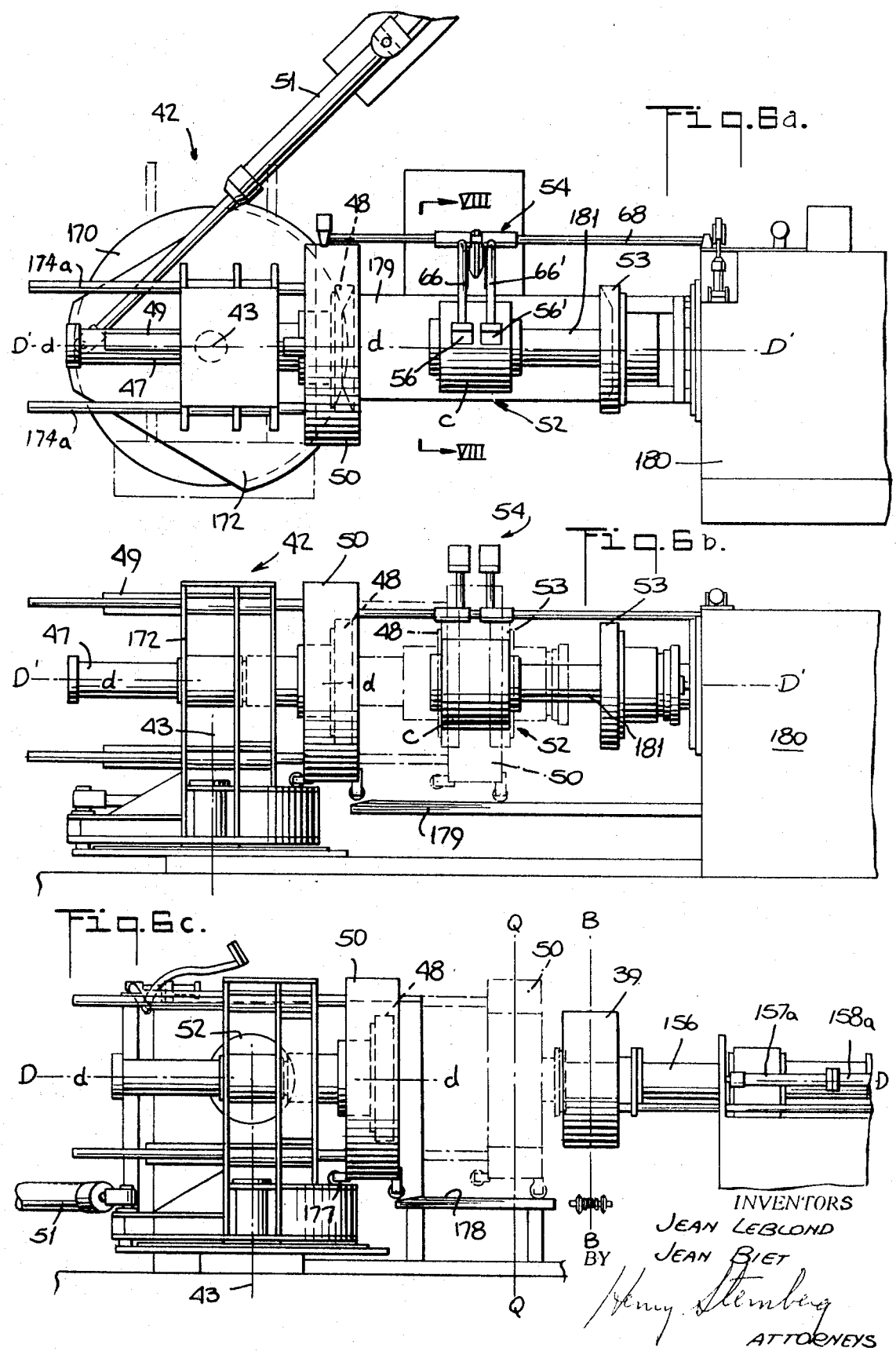

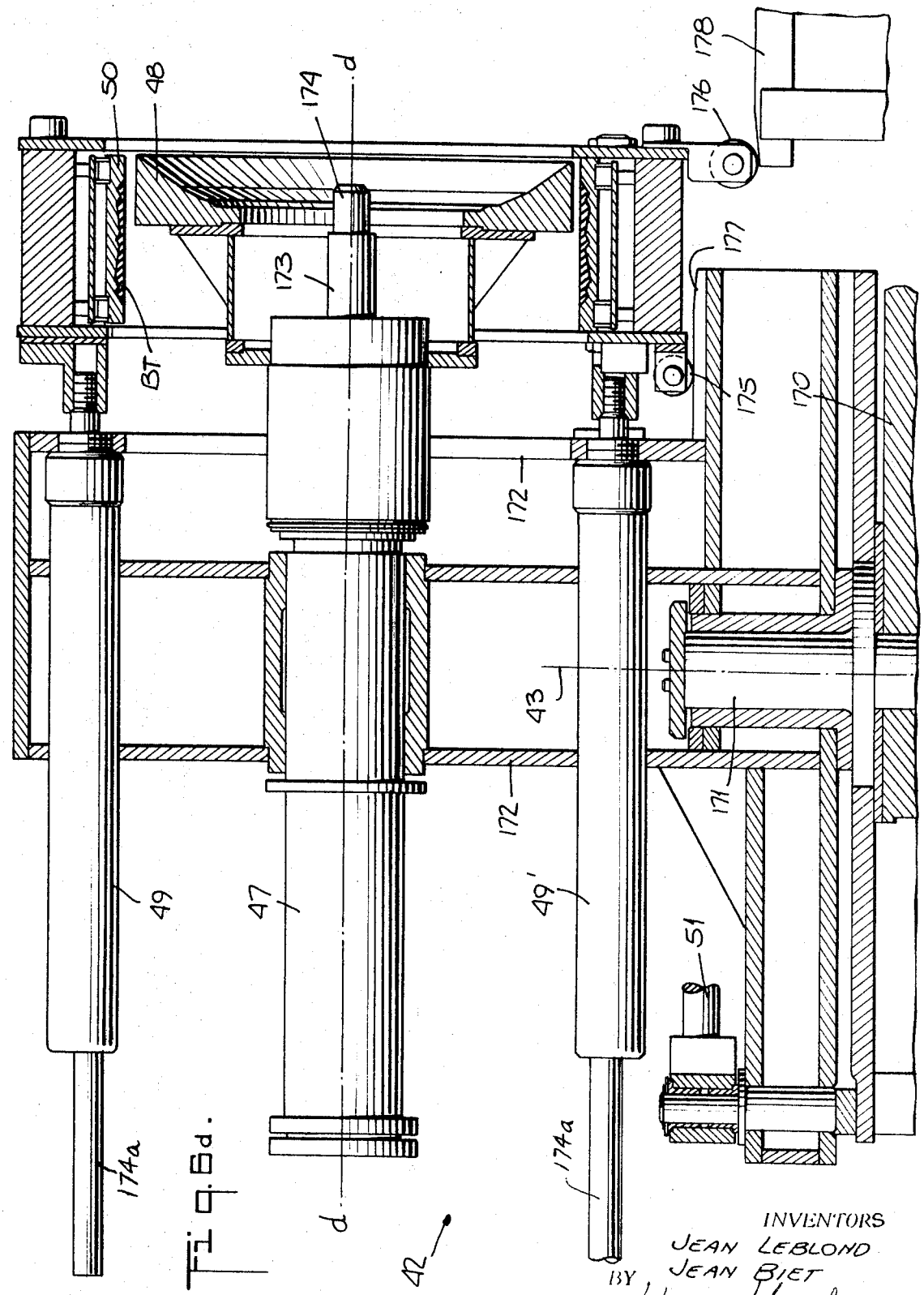

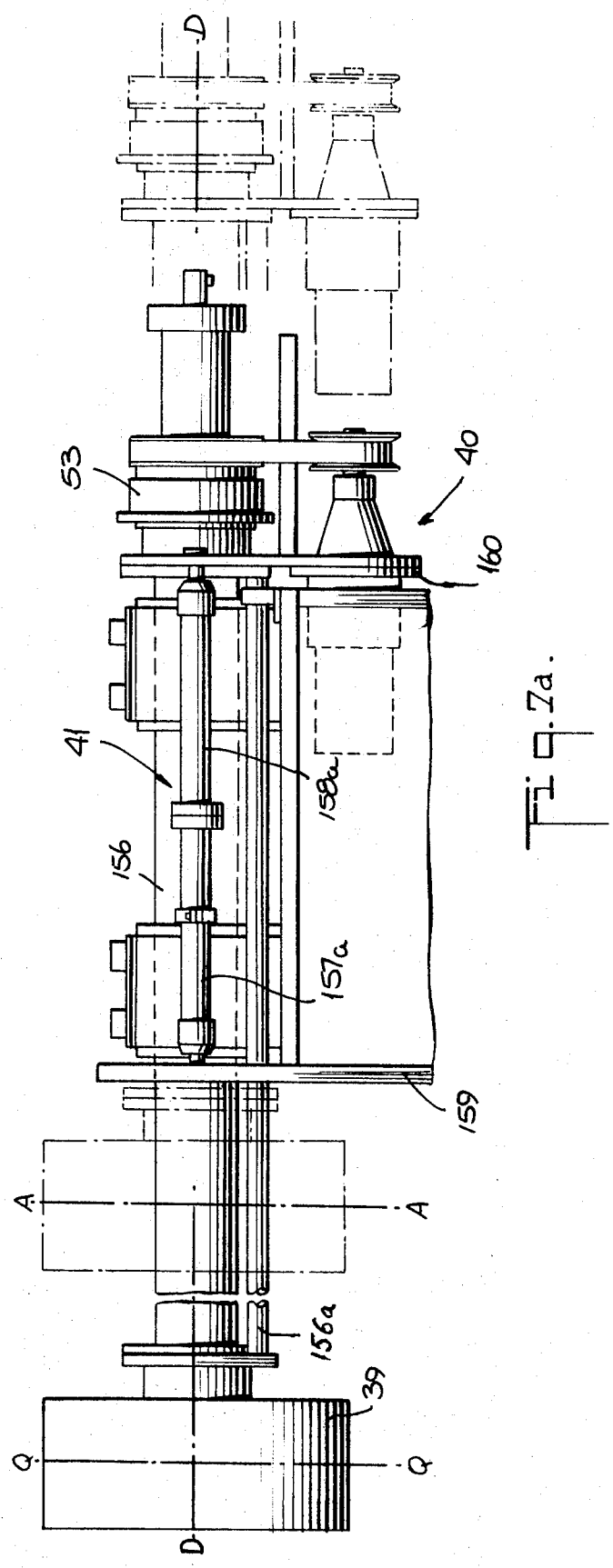

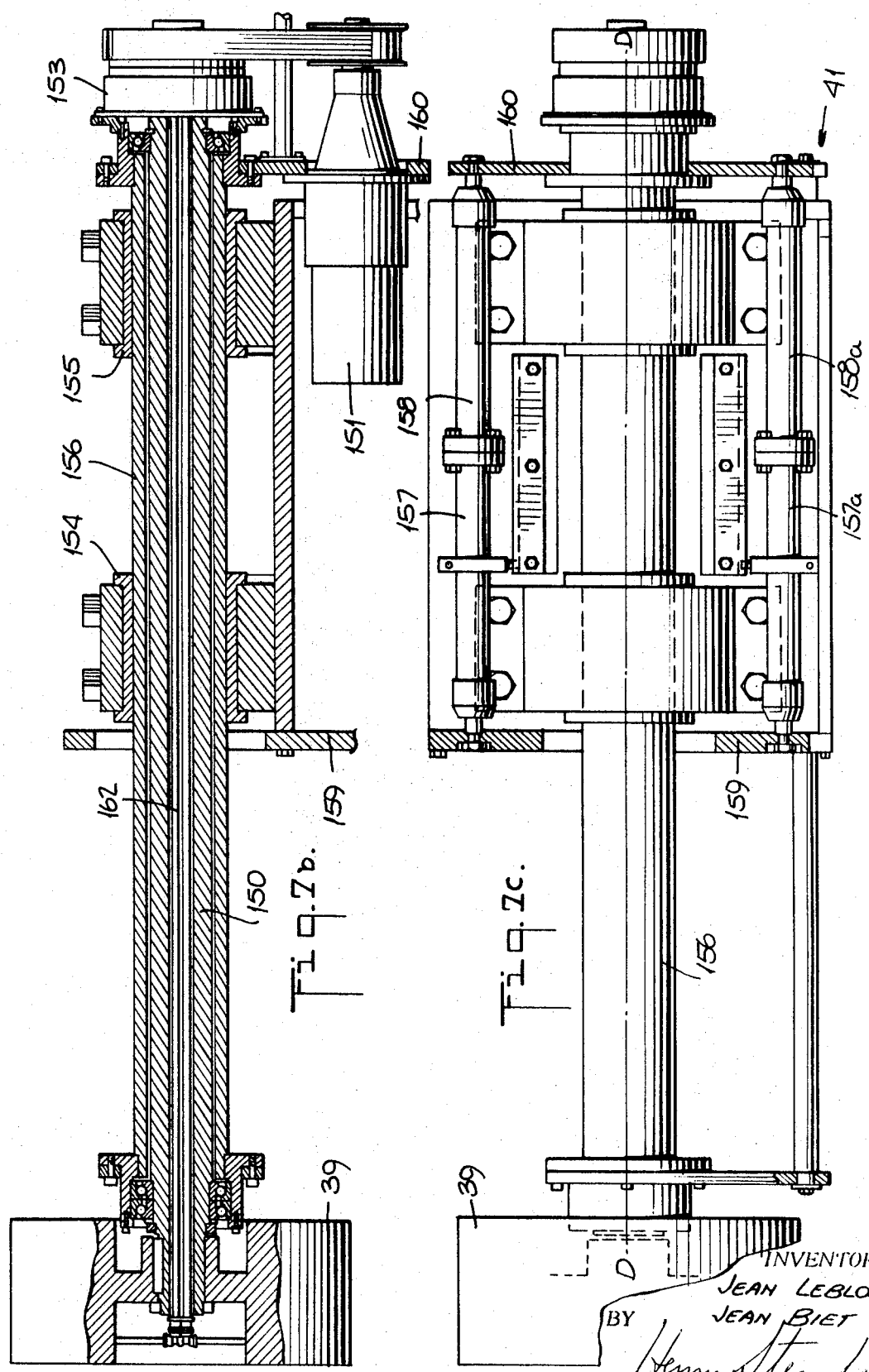

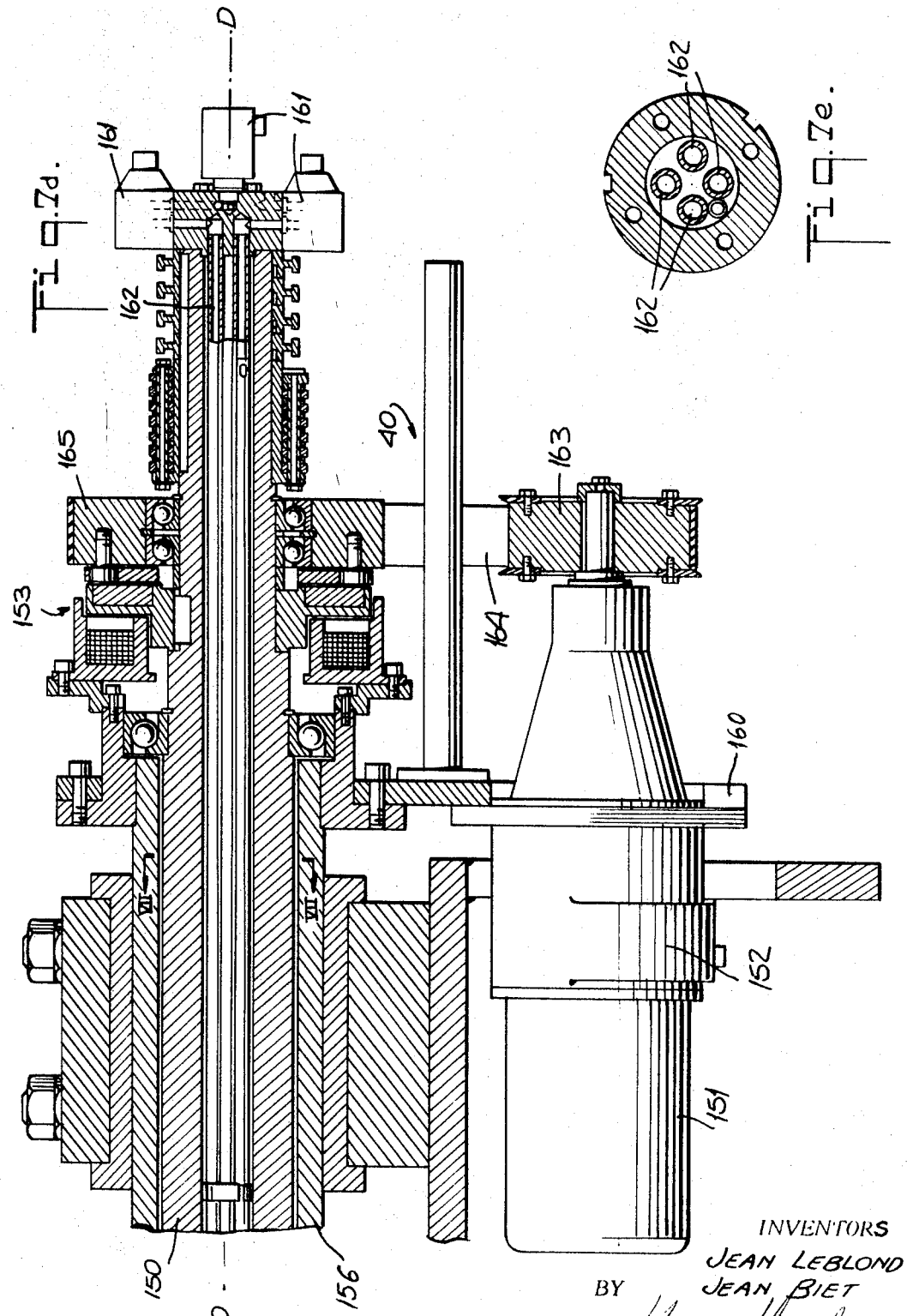

3,591,439
TIRE BUILDING MACHINE HAVING PLURAL SUPPLY POSITIONS AND AN AXIALLY SHIFTABLE DRUM
Jean Leblond and Jean Biet, Compiegne, France, assignors to Uniroyal Englebert France S.A., Paris, France
Filed Oct. 3, 1968, Ser. No. 764,664
Claims priority, application France, Oct. 9, 1967, 123,801
Int. Cl. B29h 17/20
U.S. Cl. 156—396                    25 Claims

ABSTRACT OF THE DISCLOSURE

A tire building machine having a pair of supply mechanisms for simultaneously supplying a pair of continuous strips of breaker material of the same or different physical characteristics, a pair of severing devices which sever the strip into strip portions, a pair of transfer mechanisms for transporting the severed strip portions, respectively, to a pair of spaced locations, and a single breaker building drum which is intermittently shiftable along a fixed axis between three stopped positions two of which coincide with said spaced locations, respectively. After the breaker plies are built up on said building drum at said pair of spaced locations a tread applicator mechanism, also located at the second location, applies a strip of tread material around the breaker ply assembly. In the third position of the building drum a transfer ring cooperates therewith for transferring a completed breaker-tread assembly from the building drum onto a carcass supported on a carcass support member.

BACKGROUND OF THE INVENTION

This invention relates to an improved tire building machine and, more particularly, to a tire building machine having an improved combination of mechanisms for fabricating breaker plies, assembling said plies into an annular breaker assembly, applying tread material around such breaker assembly, and assembling the resulting breaker-tread assembly with a tire carcass.

In the building of tires having breakers or belts incorporated in the crown area of the tire, as in the case of radial ply, belted tires for example, a two stage process is conventionally employed. During the first stage of building, a cylindrical carcass is formed having (1) one or more rubber covered cord plies wound around and interconnecting axially spaced, parallel, coaxial, bead cords and (2) a layer of rubber sidewall stock on each sidewall area of the carcass, intermediate the eventual crown area thereof and the two bead areas thereof. Such a carcass is referred to herein as the "first stage carcass." During the second stage of building, the shape of the first stage carcass is changed from a cylinder to a toroid and one or more rubber covered cord breaker plies and a rubber tread slab are added to the crown portion of the carcass to form what is referred to herein as the "second stage carcass." The term "rubber" as used herein is intended to cover natural rubber, man-made rubber and rubbery materials. The term "cord" as used herein is intended to cover single strand and multiple strand, filaments, wires or cables of natural and synthetic textile materials such as cotton, rayon, nylon, polyester, glass fiber and the like, metal and/or such other materials as may be used as reinforcements in pneumatic tires.

A number of machines have heretofore been developed which are utilized in building a first stage carcass for later use in the general process referred to above (see for example, U.S. Pat. No. 3,157,542 to H. W. Trevaskis, dated Nov. 17, 1964 and U.S. Pat. No. 1,938,787 to A. O. Abbott, Jr., dated Dec. 12, 1933). In these machines a number of layers of fabric are assembled together on a cylindrical former for producing a first stage carcass. The arrangements of these machines is such that the former moves from one rotary applicator drum to the next in order to get oppositely oriented plies applied thereto. In each instance, in addition to axial movement from one applicator to another the former is moved transversely at each applicator station toward and away from the surface of the applicator drum for application of the plies. Inaccuracies as well as added expenses can result from the need for these additional movements.

A number of machines have heretofore also been developed which are utilized in building second stage carcasses in accordance with the general process referred to above (see, e.g., U.S. Pat. No. 3,125,482 to W. Niclas et al., dated Mar. 17, 1964). In such machines, the cylindrical shape of the first stage carcass is changed into the toroidal shape of the second stage carcass on an inflatable drum; breaker-tread assemblies are fabricated by successively winding the various plies of each breaker and the tread layer about a radially expansible and contractible auxiliary building drum; each breaker-tread assembly is then transformed from the outer surface of the auxiliary drum to the inner surface of a radially expansible contractible transfer ring which is brought into a position surrounding the breaker-tread assembly; the breaker-tread assembly building drum is then contracted to allow movement of the transfer ring with the breaker-tread assembly therein to a position surrounding a carcass on an inflatable drum; the inflatable drum is then expanded and the crown area of the carcass thereon expands into pressurized contact with, and adheres to, the inner surface of the breaker-tread to form the second stage carcass.

Although commercially acceptable tires can be made on the aforesaid known tire machines, the construction of the known apparatus for carrying out the above process is such that many of the operations are carried out sequentially rather than simultaneously resulting in loss of valuable machine time. Furthermore, the layout of the known machines is such as to result, among other things, in inefficient use of factory space. The sequentiality of the operations and/or the application by hand of the breaker plies and treads to the building drum increases the possibility of error in alignment of the components of the workpiece, thus frequently resulting in a lack of uniformity of the tires produced by such machines. As noted above, even the constructions which are known for the production of first stage carcasses are not free of substantial risk of misalignment as a result of the required transverse movements of the former with respect to each of the rotary applicator drums in addition to the axial shifting of the former from one applicator drum to the next.

Accordingly, the primary objective of the present invention is to obviate the foregoing disadvantages by providing an improved tire building machine.

Another object of this invention is to provide a tire building machine having a higher production rate than the presently known tire building machines.

A further object of this invention is to provide a tire building machine capable of producing tires with greater uniformity than the known tire building machines.

Yet another object of this invention is to provide a tire building machine of the above type requiring a minimum amount of factory space.

It is a still further object of this invention to provide a tire building machine capable of simultaneously handling two continuous strips of breaker material of different physical characteristics and/or which are differently oriented with respect to each other.

A concomitant object of the present invention is to provide a machine of the above type in which the loading, assembly, and unloading stations are all readily accessible to a single operator.

Further objects and advantages of this invention will become apparent as the following description proceeds.

SUMMARY OF THE INVENTION

Briefly stated and in accordance with one embodiment of this invention, a tire building machine is provided with (1) a pair of supply means for supplying a pair of continuous strips of bias-cut breaker material which may have the same or different physical characteristics and the cords of which may be similarly or oppositely oriented with respect to each other, (2) severing means for severing strip portions from each of the continuous strips of breaker material, (3) a pair of spaced breaker applicator means for applying the severed strip portions to a single breaker building drum, the latter being shiftable along a fixed axis between a first position in which it is in registry with the first of said breaker applicator means, a second position in which it is in registry with the second breaker applicator means and a third position in which it is spaced from both the first and second breaker applicator means, (4) a tread applicator means adjacent such second position for applying a strip of tread material to the breaker assembly built up on the breaker building drum, and (5) a transfer ring cooperable with the breaker building drum when the latter is in the third position thereof for transferring a completed breaker-tread assembly from the building drum onto a carcass supported on a carcass support means. Preferably the axis of the carcass support means is at right angles with respect to the fixed axis of the building drum and the transfer ring is supported for pivotal movement between a first angular position in which it is coaxial with said fixed axis and a second angular position in which it is coaxial with said carcass support means. The transfer ring being shiftable on the said pivot means along its own axis.

BRIEF DESCRIPTION OF THE DRAWINGS

While the specification concludes with claims particularly pointing out and distinctly claiming the subject matter regarded as this invention, it is believed that the invention will be better understood from the following description, taken in connection with the accompanying drawings in which:

FIG. 1a is a diagrammatic plan view of the machine according to the present invention;

FIG. 1b is a top plan view showing somewhat enlarged a portion of the machine illustrated in FIG. 1a;

FIG. 1c is a front elevational view of the portion of the apparatus shown in FIG. 1b;

FIG. 2a is a top plan view showing in enlarged scale a portion of the apparatus illustrated in FIG. 1c;

FIG. 2b is a front elevational view of the portion of the apparatus illustrated in FIG. 2a;

FIG. 3 is a transverse sectional view, in enlarged scale, of the breaker transfer drums illustrated in FIGS. 2a and 2b;

FIG. 4 is a partial, sectional view, taken in the direction of the arrows IV–IV of FIG. 3, showing in enlarged scale one type of locking device for releaseably locking a pair of segments to each other;

FIG. 5a is a partial enlarged elevational view of the severing means according to the present invention;

FIG. 5b is a top plan view of the severing means of FIG. 5a;

FIG. 6a is a top plan view showing in enlarged scale the turret and the carcass support structure of the present invention;

FIG. 6b is a front elevational view of the structure of the structure of FIG. 6a;

FIG. 6c is a side elevational view of the turret of FIGS. 6a and 6b showing the latter pivoted 90° from its FIG. 6a and 6b position;

FIG. 6d is an enlarged sectional elevational view of the turret of FIGS. 6a, 6b and 6c;

FIG. 7a is a partial side elevational view of the breaker building drum support structure (Unit "D");

FIG. 7b, is a partial, somewhat enlarged partly sectional view of the structure of FIG. 7a;

FIG. 7c is a top plan view of the structure of FIG. 7b;

FIG. 7d is a partly sectional elevational enlarged view of a portion of the structure of FIG. 7a;

FIG. 7e is a transverse sectional view taken along the line VII—VII of FIG. 7d, in the direction of the arrows; and FIG. 8 is a diagrammatic illustration of the carcass coating device as seen generally in the direction of the arrows VIII—VIII of FIG. 6a.

DESCRIPTION OF THE PREFERRED EMBODIMENT

Breaker strip supply unit A

Referring to FIGS. 1a, 1b and 1c, the apparatus according to the invention includes a unit A comprising a pair of supply units 1 and 1' for supplying a pair of continuous strips R and R', respectively, of magnetically attractable breaker material. The strips R and R', which are respectively wound up on spools 2 and 2' may have different widths and possibly the inclinations of their cords with respect to their longitudinal axes may be different. For obvious convenience of reloading, however, i.e., initially winding the continuous strips on the spools, the said strips are wound up in the same direction on the different spools. Thus, even though it may ultimately be desired to have the strips oriented in opposite directions, the initial winding of the strip material onto the spools 2 and 2' is done in the same direction, i.e., with respect to those spools, so that as far as the winding operation is concerned the cords of the breaker strips R and R' always have the same orientation, irrespective of which of the spools 2 or 2' is being wound.

The strip supply units 1 and 1' are each preferably of the type described in copending U.S. patent application 750,994 filed by J. Leblond and J. Biet on Aug. 7, 1968, now issued as U.S. Pat. 3,498,555. As described in the aforesaid patent application, the supply units 1 and 1' each includes an unwinding station defined by stationary frames 3 and 3' on which the drive and control elements of the respective unit is mounted, and a movable dolly 4 and 4', respectively, on which there is mounted the breaker strip supply spool 2 and 2', respectively, and a liner take up spool 2a and 2a'. While the liner material which separates adjacent convolutions of the breaker material on the spools 2 and 2' is wound on spools 2a and 2a', respectively, the continuous strips of breaker material R and R' are fed to a pair of transport mechanisms preferably comprising a pair of parallelly arranged endless belt conveyors 6 and 6' of well known type, the said strip materials resting on the upper runs of the endless belts so as to be transported thereby. When, as is the usual case, it is desired to have the breaker assemblies built up of successive plies whose cords form a crossing angle with respect to each other, the otherwise identical movable dollies 4 and 4' are reversed with respect to each other so as to assume the positions illustrated in FIG. 1c. Thus, even though these dollies as well as the stationary portions of units 1 and 1' are identical with respect to each other in all respects, except for a reversing roller 5 on unit 1 which does not have a counterpart on unit 1', the continuous strips R and R' fed therefrom, respectively, are oriented in reverse direction with respect to one another. The roller 5 is preferably rotatably mounted on the stationary frame 3 of unit 1 and thus remains in place when a dolly 4 having an empty spool 2 is replaced by a dolly 4 having a full spool 2.

It will thus be seen that the strips R and R', wound respectively on the spools 2 and 2' whose median planes A—A and B—B are parallel, are each unwound by the action of the belt conveyors 6 and 6', respectively. The conveyors 6 and 6' deliver the continuous strips R and R' to a strip processing Unit B comprising a pair of applicator units 12 and 12' which process breaker plies, orient the breaker plies in desired fashion, and transfer the oriented breaker plies to a breaker building Unit D as will be described in more detail hereinbelow.

Adjacent the downstream end of each of the conveyors 6 and 6' there is preferably located a breaker strip centering device (Unit F) 33 and 33' such as the one described in copending U.S. patent application Ser. No. 644,175, filed on June 7, 1967 by J. Leblond. Preferably each of these centering units includes a pair of endless belts forming a generally horizontal, moving support surface for supporting the respective material as it passes through the device, and a pair of driven endless belts forming vertical, horizontally spaced, moving surfaces for contacting and guiding the side edges of the strip material as it passes through the device so as to maintain the continuous strips R and R' in registry with the medium planes B—B and A—A, respectively.

Breaker fabricating and transfer Unit B

The breaker fabricating and transfer Unit B is located in the region of the downstream ends of the conveyors 6 and 6', and includes a first and second applicator means comprising a pair of segmented breaker transfer drums 12 and 12' which are axially spaced and rotatably mounted on a common shaft 7. Each of the segmented drums 12 and 12' and their respective mounting and drive means are preferably of the type described with respect to a single drum in copending U.S. patent application 749,810 filed by J. Leblond on Aug. 2, 1968. It will be noted, however, that while the segmented drum of the latter copending patent application is pivotally mounted, the axis 11 of drums 12 and 12' of the instant invention is fixed in space a given, but adjustable, distance from the axis D—D of the breaker building drum 39. Thus, each of the latter drums 12 and 12' (only drum 12 will be described, the corresponding parts of drum 12' being similarly numbered but followed by a "prime" (') designation), preferably comprises a pair of wheels 12a and 12b each having a sector member 13a and 13b, respectively, mounted on the periphery thereof and rotatable about the common fixed axis 11. The common shaft 7 of the drums 12 and 12' is supported on a movable frame 8 which in turn rests on an inclined face 10 of a fixed frame 9 so as to be slidable thereon for adjustment, by any suitable means such as adjustment screw 9a, in a direction parallel to the planes A—A and B—B. Unit B preferably also includes a pair of severing means 25 and 25' cooperating respectively with the drum 12 and 12' and including rotary cutters 126 and 126' movable upwardly and downwardly along a pair of oppositely inclined paths. The angle of inclination of each of these paths corresponds to the angle of inclination of the cords of the continuous strips R and R', respectively, with respect to the longitudinal axis thereof.

The severing means 25 and 25' cooperate with the respective drums 12 and 12' to sever thereon the continuous strip material R and R', into strip portions, R$a$, R$b$ and R$a'$, R$b'$, respectively. The severing means are similar to those described in the last mentioned copending U.S. patent application 749,810 and differ therefrom in only certain respects which will be described in detail hereinbelow.

The strip R supplied by the device 1 of supply unit A is brought by the transporter 6 to the transfer drum 12 while the strip R' supplied by the device 1' of supply unit A, is transported by the conveyor 6' to the drum 12'.

The applicator means includes the pair of drums 12 and 12' each including a pair of coaxial adjacent wheels 12a, 12b and 12a', 12b', respectively, having hubs 14, 15 and 14', 15' respectively. Since the drums 12 and 12', and their respective drives are identical except except for the size and possibly the configuration of the sectors 13 ($a$, $b$,) and 13' ($a$, $b$) only one of such drums need be here described. The hub 15 of wheel 12b is rotatably supported by conventional bearings on the common shaft 7 while the hub 14 of the wheel 12a is rotatably supported on the hub 15 so as to make the wheel 12a, 12b independently rotatable with respect to said shaft 7 and with respect to each other. Each of the wheels 12a and 12b further includes a pair of axially spaced disks respectively connected to opposite faces of the respective hubs. Mounted on the pair of disks of wheel 12a, at the peripheral edge of the latter, is one segmental portion 13a of a pair of segmental portions 13a, 13b of a common cylinder. Thus segment 13a has a cylindrical outer surface coaxial with the common shaft 7 and extending over a portion only of the periphery of said drum 12. Similarly, wheel 12b carries segmental portion 13b fixed to the peripheral edge of the disks thereof and extending over a portion only of the periphery of wheel 12. The segments 13a and 13b each have an inner mounting portion fixed to the respective one of said wheels, and an axially extending outer breaker-supporting surface portion. The outer portion of each segment extends axially toward and in overlapping relationship to the other wheel of the same drum, but in circumferentially staggered relationship with each other. Thus each of the wheels 12a', 12b' of drum 12' has on part of its periphery a segment member having an outer breaker-support surface portion which when developed in a plane corresponds in size and shape to the inner breaker ply, while each wheel 12a, 12b of the drum 12 has on its periphery a segment member having an outer breaker-support surface portion which, when developed in a plane, corresponds in size and shape to the outer breaker ply to be assembled on the breaker building drum 39.

Each of these segments, therefore, when developed in a plane, corresponds in shape to a plane parallelogram-shaped figure whose longer sides are parallel to the equatorial plane of the finished tire and whose shorter sides are parallel to the wires or cords of the respective bias-cut fabric ply strips R, R'. It will be seen that the surface portions of segments 13a', 13b' of drum 12' may be wider than the corresponding surface portions of segments 13a, 13b of drum 12 so that breaker plies of different width may be successively transferred toward and applied to the breaker building drum 39. Furthermore, the second applicator means comprising drum 12, for applying the second, or outer, breaker ply to the building drum 39 has segments 13a, 13b whose outer breaker ply supporting surface portions are of smaller radius than the corresponding inner-breaker ply supporting surface portions of the segments 13a', 13b' of drum 12', so as to allow for the extra thickness of the first (inner) ply which is already on the breaker building drum when the second (outer) ply is transferred thereto. It should be noted in this connection that in accordance with the present invention the center to center distance between the fixed axis D—D of the breaker building drum 39 and the axis 11 of the drums 12 and 12', while being initially adjustable, remains fixed during operation of the machine.

The drums 12, 12' are such that their circumference exceeds the sum of the lengths of the segments 13a and 13b or 13a' and 13b' so that the segments of each drum are rotationally displaceable with respect to each other. The segments of each drum are therefore angularly shiftable with respect to each other from a first position in which one adjacent pair of transverse edge portions abut each other to a second position in which the opposite pair of adjacent transverse edge portions abut each other. As described in the latter patent application 749,810, the pair of wheels of each of the drums 12 and 12' may be releasably locked together in either of such end positions by permanent magnet members on one wheel of each pair cooperating with magnetizable blocks located on the other wheel of such pair, or by any other suitable releasible locking means such as for example the one illustrated in FIG. 4 of the drawings. Here there is illustrated a scissor-like clamping device 78 having a pair of jaws 28 and 29 pivotable about an axis 30 and tensioned at one end by a coil spring 31 which urges the jaws 28, 29 toward their closed, i.e., clamping condition (seen in FIG. 4). The clamp 78 is fixed at its shaft 30 to one of the wheels, for example wheel 12b, of a pair of wheels comprising one of the drums while the other of such pair of wheels, for example wheel 12a, carries a rod 32 having a bulbous free end portion adapted to be engaged by the clamping fingers 28 and 29 in the manner illustrated in FIG. 4. Thus, the spring 31 acts to maintain the corresponding pair of wheels, for example 12a, 12b locked in the desired end position thereof until sufficient force is exerted on the wheels to move the rod 32 out of the clamp 78, i.e., to overcome the action thereon of spring 31.

Locking means 70 and 70' are provided on frame 8 for selectively locking the individual wheels 12a, 12b and 12a', 12b' of drums 12 and 12', respectively, against angular movement. These locking means may be in the form of solenoid operated plungers 71, 71' carried on frame 8 and cooperating respectively with conical recesses 72, 72', respectively, provided in each of the wheels 12a, 12b, 12a', 12b' as described in the aforesaid copending U.S. patent application 749,810.

A drive means is provided for rotating the sectors 13a, 13b, 13a' and 13b', respectively, about the common shaft 7. This drive means preferably comprises four electric drive motors 16a, 16b, 16a', 16b', positioned on frame 8 and each associated with a corresponding speed reducer unit 19a, 19b, 19a' and 19b' to which it is suitably connected by conventional means such as for example a positive drive belt 17a, 17b, 17a' and 17b'. The speed reducer units have shafts 21a, 21b, 21a', 21b', respectively, which extend parallel to the axis 11 of shaft 7 and which are connected to electromagnetic clutches 18a, 18b, 18a', 18b', respectively, coaxial therewith, and the outward shafts of which clutches carry toothed drive pinions 22a, 22b, 22a', 22b', respectively. These pinions drivingly connect the respective shafts—preferably by a positive drive belt—to toothed pinions 24a, 24b, 24a', 24b', respectively integral with the sleeves 14, 15, 14' and 15'. Actuation of the motor 16a, therefore, results when the clutch 18a is in engaged condition, in rotation of the sector 12a about the fixed axis 11.

Similarly, the rotation of the sector 12b around the axis 11 is obtained by actuation of the motor 16b, with the clutch 18b in engaged condition, it being understood that the toothed pinion 24b for driving the sector 12b in rotation is integral with the sleeve 15. The sectors 12a' and 12b' may be similarly rotated by energizing the corresponding motors 16a' or 16b' and actuating the corresponding clutch 18a' or 18b'.

As previously noted, the drums 12 and 12' are associated repectively with severing means 25 and 25' (FIGS. 5a and 5b) of the same type as the one described in the aforementioned patent application 749,810 and occupying the same position with respect to the associated drum as the severing means of the above application occupy with respect to the drum described therein when the latter is in its rearmost cutting position. In accordance with the present invention severing takes place in only a single direction namely the descending direction of the cutter assemblies and the latter are arranged in such a manner that the cutter blades 126, 126' are retracted, i.e., out of engagement with the drums 12 and 12' during their ascending stroke. Each of the severing means includes a carriage 128 reciprocable along a pair of guide rods 129 in response to actuation of a parallelly oriented hydraulic cylinder 130. The carriage 128 pivotally supports thereon an arm 131 at one end of which is rotatably supported the rotary cutter blade 126, for severing the strip material R on the drum 12. A hydraulic actuator 125 is articulately connected to the carriage 128 at 132 and includes a piston rod reciprocable therein in a direction parallel to the guide rods 129. The piston rod is in turn articulately connected to the arm 131, the cylinder 125 may be actuated to retract the cutter blade away from the surface of the drum 12 during ascending strokes of the cutter assembly and to maintain the required constant pressure between the cutter blade 126 and the cutting plate 127 of the corresponding drum segment during the descending stroke of the cutter carriage 128 for severing the strip material R therebetween. The strip material R' is severed by identical cutter means 25' cooperating with the drum 12'. It will be noted that each of the segments of the transfer drums 12 and 12' has positioned along one of the transverse edges thereof a cutting plate 127 of hardened material against which the cutter blade 126 moves during the cutting stroke.

Each of the segments of drums 12 and 12' of Unit B, as well as the breaker building drum 39, preferably has on its surface peripherally extending permanent magnet means such as are described in the aforesaid copending U.S. patent application 749,810 for attracting thereto the magnetizable strip material R, R' and the strips Ra, Rb, Ra', Rb' as the case may be. Preferably the permanent magnet means on the periphery of the breaker building drum 39 exceed in strength the magnet means located on the periphery of at least the drum 12' so as to facilitate the required transfer of the severed strip portions, Ra', Rb' i.e., the inner breaker plies from the drum 12' onto the building drum 39. Transfer of the outer breaker ply i.e., strip portions Ra, Rb from drum 12 to the breaker building drum 39 is facilitated at least in part by the tackiness of the material of the inner breaker ply previously applied to the building drum 39.

Tread applicator—Unit C

Integral with the fixed frame 9 but at a lower elevation than the first and second applicator means i.e., Unit B, there is mounted a third applicator means, namely tread transfer Unit C which is preferably of the type described in copending U.S. patent application 740,209 filed on June 26, 1968 by J. Leblond. The tread transporting arrangement there described includes a pair of horizontally extending endless chain conveyors 140a and 140b between which are carried a plurality of horizontal tread support plates 141. The loaded tread supports 141 each carrying an individual strip of tread material T are carried on the upper horizontal run of the conveyors 140a and 140b in the direction from the loading station X to the unloading station Z (FIG. 1b) and return empty on the lower run of the conveyors 140a and 140b. Conveyor means are preferably provided at the tread loading station X for loading the strips T onto the support plates 141 and for moving the loaded supports onto the conveyors 140a and 140b in a direction perpendicular to the direction of movement of the latter conveyors, while other means are preferably provided at the unloading station Z for successively moving the loaded supports 141 along median plane B—B (FIG. 2a) i.e., parallel to the loading direction, onto a conveyor 143 which is vertically adjustable into and out of tangential contact with the breaker building drum 39.

The adjustable conveyor 143 has a downstream free end portion adapted to bring a tread strip T into tangential contact with the breaker building drum 39. In each cycle of operation of the apparatus, a loaded tread support 141 is shifted from its position on conveyors 140a and 140b onto the conveyor section 143 so as to position the strip of tread material T thereon at the unloading station Z in readiness for being applied around a pair of breaker plies built up on drum 39. Thus, the tread supply Unit C is cycled in such a manner that at the end of a cycle of building a breaker ply assembly on the building drum 39 there is positioned on the ramp 143 a loaded tread support 141. It will be seen that in the preferred embodiment the ramp 36 at the loading station X, has its longitudinal axis perpendicular to the longitudinal axis of the horizontal conveyor 140a, b and is adapted to bring loaded supports 141 onto said conveyor and to return empty supports from the latter to the loading station.

Breaker-tread assembly—Unit D

The apparatus also includes a Unit D comprising the breaker building drum 39 which is preferably substantially identical to the building drum described in the copending U.S. patent application Ser. No. 717,786, filed by J. Leblond on Apr. 1, 1968. The breaker building drum 39 is rotatably and axially movably supported on an axis D—D which is fixed in space. Building drum 39 is supported on a central supporting member 150 (FIGS. 7a–7c) for axial movement between three distinct working positions, namely, a first position in which the median plane of the building drum coincides with the plane A—A, a second position in which the same median plane of the building drum coincides with the plane B—B, and a third position in which the same median plane of the building drum is situated beyond the planes A—A and B—B, i.e., a position in which the breaker building drum 39 is spaced from both the drums 12 and 12', for example a position in which the building drum is in registry with plane Q—Q, as will be described in more detail below.

For rotational movement of the collapsible breaker building drum there is provided a drive means 40 (FIGS. 7a–7d) including preferably an electric motor 151, a speed reducer 152 suitably connected to the output of the electric motor, and an electromagnetic clutch 153 suitably interposed between the output of the speed reducer and the shaft 150 supporting the breaker building drum 39. Slidably received in appropriate sleeves 154 and 155, is an elongated hollow shaft 156 (FIG. 7b). Hollow shaft 156, while being rotationally fixed by guide rod member 156a is axially movable in stationary sleeves 154 and 155 by an actuator (41) means comprising preferably two sets of back-to-back connected hydraulic or pneumatic jacks 157 and 158 and 157a and 158a, respectively. Each such set of back-to-back oriented jacks having corresponding pistons reciprocably received therein with the free end of one piston rod of each set connected to the stationary frame 159 and the free end of the opposing piston rod connected to a movable bracket 160 (FIG. 7c) which is rigidly connected to the movable hollow cylindrical outer shaft 156. It will be seen that when all four cylinders are in retracted condition, as illustrated in FIG. 7c, the breaker building drum 39 is in its third position i.e., in registry with the plane Q—Q (FIG. 1a). When one corresponding set of each pair of jacks, e.g., jacks 158 and 158a, is actuated, the drum 39 is moved thereby to its second position i.e. in registry with the plane B—B, and when all four of the hydraulic cylinders are actuated the drum 39 is moved thereby to its first position i.e., in registry with the plane A—A.

The inner elongated shaft 150 is rotatably supported inside the said outer axially slidable but rotationally fixed shaft 156 with suitable bearings located preferably at opposite ends. The inner rotatable shaft 150 is keyed at one free end thereof to the breaker building drum 39 for rotationally driving the latter. A suitable number of solenoid valves 161 (FIG. 7d) are provided adjacent the other end of shaft 150 for controlling the flow of pressure fluid, preferably air under pressure, through suitable conduits 162 (FIG. 7e) extending through the central region of the hollow shaft 150 to the breaker drum 39 for controlling the expansion and contraction movements of the latter. These movements occur in the manner described in the copending U.S. patent application Ser. No. 717,786 referred to above.

The drive means for rotating the inner shaft 150 and therewith the breaker building drum i.e. the electric drive motor 151 and suitable speed reducer are together affixed to bracket 160 which is integral with the outer slidable shaft 156. Preferably a toothed pulley 163 at the output shaft of the speed reducer drives a toothed drive belt 164 which in turn positively drives a toothed driven pulley 165 which is coaxial with but relatively rotatably supported by suitable bearings on the inner rotary shaft 150. The electromagnetic clutch 153 is arranged coaxially with the axis D—D for drivingly connecting the driven pulley 165 with the rotary inner shaft 150 in response to actuation thereof. The breaker building drum 39 may thus freely idle, together with the said inner shaft 150 on which it is mounted, or it may be rotationally driven by the electric motor 151, depending upon the condition of energization of the electromagnetic clutch 153. Also located along the horizontal axis D—D, but spaced from the said third position of the breaker building drum 39 i.e., the position in registry with plane Q—Q, is a turret 42 supported for rotation about a vertical axis 43 which intersects the horizontal axis D—D. This turret 42, shown in axial section in FIG. 6d, includes a fixed base 170 in which is supported a central, vertically disposed, upwardly extending stub axle 171. A movable housing 172 is pivotally supported on the stub 171 with suitable bearing means interposed between the movable housing 172 and the fixed base 170 to permit pivotal movement of said housing with respect to the base. A horizontally extending hydraulic jack 51 is articulately connected to the movable housing 172 at a location horizontally spaced from the vertical pivot axis 43, for pivoting the housing about said pivot axis.

Supported on the pivotable turret 42 is a conical sidewall engaging and shaping ring 48 of the type described in said copending U.S. patent application Ser. No. 717,786 and movable along a horizontal axis d—d which intersects the vertical axis 43 of the turret and which is located in the same horizontal plane as the previously mentioned axis D—D of the breaker building drum 39. A shifting means for shifting the conical ring 48 is preferably provided in the form of a hydraulic or pneumatic jack 47 located coaxially with the ring 48. This jack 47 preferably has its cylinder portion fixed to the movable housing 172 of turret 42 while the conically recessed ring 48 is rigidly supported on and coaxial with the free end of the piston rod 173 of the piston reciprocably received in the said cylinder. Thus, in response to actuation of the jack 47, the conical carcass shaping ring 48 is shiftable along the horizontal axis d—d between the retracted position thereof, illustrated in FIG. 6d of the drawings, and the extended positions thereof illustrated in chain lines in FIGS. 6b and 6c as will be described in more detail below. A central guide pin 174 protrudes from piston rod 173 coaxially with the interior of the conical ring 48 for ultimately guiding the latter to its final i.e. extended positions.

Also concentric with the axis d—d, there is supported on the turret 42 a radially expansible and contractible transfer ring 50 of the type described also in aforesaid copending U.S. patent application Ser. No. 717,786. The transfer ring 50 is supported for horizontal movement also along the said axis d—d by being rigidly affixed to the free ends of the piston rods of a pair of spaced horizontally disposed jacks 49 and 49' located spaced from and at opposite sides, respectively, of the centrally located jack 47. Each of the hydraulic or pneumatic actuators 49, 49' includes a cylinder portion suitably fixed to the housing 172 of the turret 42 and a piston reciprocably received in such cylinder portion. The interior surface of the transfer ring 50 has a contour which corresponds to the outer surface of the strip of tread material T of a built-up breaker-tread assembly. The outer and inner diameters of the rings 48 and 50, respectively, are such that the transfer ring 50, even in radially contracted condition thereof, as illustrated in FIG. 6d, and while supporting at the interior thereof a built-up breaker-tread assembly BT, may be axially retracted into the FIG. 6d position thereof i.e., surrounding the ring 48, while the latter is also in its axially retracted position.

Guide means, preferably comprising guide rods 174a fixed to the housing of transfer ring 50 and suitably slidable in housing 172 of the turret 42, are provided for guiding the ring 50 for movement between its aforesaid axially extended and retracted positions. Additionally, a pair of spaced guide rollers 175 and 176 may be provided on ring 50 for guiding the ring 50 along suitable guide surfaces 177, 178 and 179 during, respectively, retraction thereof in the region adjacent turret 42, extension thereof along axis D—D, and extension thereof along axis D'—D'.

Guide surface 177 is provided on the pivotable housing 172 of turret 42 while guide surfaces 178 and 179 are provided on the fixed supports of Units D and E, respectively. It will be understood that the roller 175 rides along the turret surface 177 when the ring 50 nears the retracted position thereof, while the roller 176 rides along either the fixed surface portion 178 or 179—whenever the transfer ring is moving toward or away from its extended position along either the axis D—D or the axis D'—D'.

With the turret in the angular position thereof illustrated in FIG. 1a, i.e., with the axis d—d coinciding with the axis D—D of the breaker building drum, the throw of the hydraulic or pneumatic actuators 49, 49' is such as to permit shifting of the transfer ring 50 axially along the axis d—d from the retracted position thereof illustrated in FIG. 6d to an extended position in which the transfer ring 50 is in registry with and surrounds the breaker building drum 39 when the latter is in its third position thereof, i.e. the position thereof in registry with plane Q—Q.

Carcass assembly—Unit E

A carcass support and shaping drum 52 preferably of the type described in the aforesaid copending U.S. patent application Ser. No. 717,786, is supported coaxially with a second horizontal axis D'—D' located in the horizontal plane of first mentioned axis D—D and preferably normal to the latter at the point of intersection with the vertical axis 43. The throw of the actuator 51 is such as to pivot the turret 42 about its vertical axis 43, in response to actuation of jack 51, from the first position thereof illustrated in FIG. 1a, i.e., the position in which the axis d—d of the turret coincides with the axis D—D of the breaker building drum 39, to a second position (FIGS. 6a and 6b) in which the axis d—d of the turret 42 coincides with the axis D'—D' of the carcass support drum 52. In other words, the turret 42 is pivotable approximately 90°, in response to actuation of jack 51.

Also supported coaxially with axis D'—D' at that side of the carcass support drum 52 which is opposite to that facing turret 42, is a second conical sidewall engaging ring 53. The conical ring member 53 is similar to the ring member 48 and is supported facing the latter in the manner described in copending U.S. patent application Ser. No. 717,786. Ring 53 is also axially moveable toward and away from the carcass support drum 52. As described in the latter copending U.S. patent application, the carcass support 52 includes a pair of carcass-support discs which are axially movable toward and away from each other for the purposes described in more detail hereinbelow. The axial movement of the carcass support discs is, however, at all times symmetrical to a median vertical plane E—E (FIG. 1a). Similarly, the pair of conically recessed rings 48 and 53, the former being mounted on the turret 42 and the latter on the frame 180 which supports the carcass support drum 52, have their axial movements coordinated in such a way, by well known control means, so as to move toward and away from each other, respectively, always in symmetry with the vertical median plane E—E of drum 52. It will furthermore be understood that all such axial movements of the rings 48 and 53 are coordinated to take place only when the turret 42 is in that pivotal position thereof in which the axis d—d coincides with the axis D'—D' of the carcass support drum 52. During pivoting movement of turret 42 the mold ring 48 as well as the tread transfer ring 50 are both in their retracted conditions as illustrated in FIG. 6d.

The pair of coaxial discs which comprise the carcass support drum 52 are axially movable toward and away from each other, as noted above, by well known means. For example, the relative axial movement of the discs along the axis D'—D' may be obtained by mounting one of the discs on a shaft 181 and by mounting the other of the discs on a sleeve which is splined on, and axially slidable relative to, such shaft. The relative motions of the shaft 181 and the sleeve may be obtained by the use of appropriate driving means of known type. The latter shaft is preferably provided with an axial conduit therein which is connected with a source of fluid under pressure, for example compressed air. The conduit discharges into the chamber formed by the first stage carcass C and the pair of end discs supporting the latter thus permitting the pressure fluid therein to be controlled in a known manner in accordance with the need of the carcass shaping operation.

Preferably there is associated with the carcass support drum 52 a device 54 for coating the first stage carcass before the application of the breaker-tread assembly, BT, thereto and for the purpose of facilitating such application. The coating is preferably a rubber solvent such as a light gasoline. The coating means 54 preferably includes a pair of arms 66 and 66' which are supported by a shaft 68 for pivotal movement in response to activation of a hydraulic or pneumatic jack 69 articulately connected to one end of each arm (FIG. 8). Each of the arms 66 carries at its free end an elongated coating pad 56 and 56' preferably made of fibrous material having absorbent properties such as, for example, felt. Each of the pads 56 and 56' is substantially immersed in a reservoir 55 and 55' fillable with coating fluid and which is fixed to the end of the respective arm. Each of the coating pads protrudes slightly from the open end of the respective reservoir. The arms 66 and 66' are pivotable as shown in FIG. 8, from a position in which the felt pads 56 and 56' are out of contact with the surface of the carcass C positioned on the carcass support drum 52, to a position in which the felt pads rest on the outer surface of such first stage carcass and coat the periphery of the latter with the coating fluid during suitable rotation of the carcass support drum 52. Preferably, suitable conduit means are provided for suitably connecting the reservoirs 55 and 55' with a master reservoir so as to automatically maintain sufficient fluid in the smaller reservoirs during operation of the device. It will be noted that in the full-line position illustrated in FIG. 8, the felt pads 56 and 56' are sufficiently spaced from the carcass support drum 52 to permit not only a first stage carcass to be positioned thereon but also to permit the breaker-tread assembly to be moved by transferring 50 into position surrounding the carcass and to be assembled thereto. Suitable known control devices for controlling the pivotal movement of the arms 66, 66' are provided to accomplish the latter purpose.

Operation of the machine

The manner in which a breaker-tread assembly BT is formed and is thereafter attached to a first stage carcass C while the latter is shaped into a second stage carcass, will now be described.

A pair of loaded dollies 4 and 4', after being oppositely oriented with respect to each other, are placed into position at stations 1 and 1', of Unit A respectively. The spools 2 and 2' carry, wound thereon, continuous strips R and R', respectively, of breaker material having therein a magnetically attractable element such as, for example, cords of magnetizable material such as magnetically attractable wire. The strip material R coming from the spool 2 is looped around the direction-changing roller 5 and thereafter onto the belt conveyor 6 which feeds the latter strip to the Unit B (FIG. 1c). At the same time the continuous strip of breaker material R' unwound from the spool 2' is positioned on the belt conveyor 6' which feeds the strip R' also to the Unit B along a path parallel to that of strip R. As seen in FIG. 1a the strip R is fed along a path coinciding with the median plane B—B of building drum 12 while the strip R' is fed along a path coinciding with the median plane A—A of the building drum 12'.

The continuous strips of breaker material R and R' adhere by magnetic attraction to the strip supporting surface portions of the segments 13a, 13b and 13a', 13b' of the drums 12 and 12', respectively. Just before contacting the respective one of the drums the continuous strips R and R' are passed respectively through the centering devices 33 and 33' of the unit F, for assuring the alignment of the strips R and R' with respect to the median planes B—B and A—A of the drums 12 and 12', respectively.

The movable frame 8 on which the drums 12 and 12' are supported, is initially adjusted with means 9a to a position in which strips of breaker material supported on the outer surface of the sectors of drum 12' will contact the peripheral surface of breaker building drum 39 during rotation of drum 12'. Such positioning of the frame 8 with respect to the fixed axis D—D will also assure the later tangential contact of a strip of breaker material supported on the outer surface of the segments of drum 12, with the first ply of breaker material on the breaker building drum 39 when the latter is moved to its second axial position, i.e. in registry with plane B—B.

Each of the breaker strip transfer and applicator drums 12 and 12' operates in a manner similar to that of the transfer and applicator drum described in the aforesaid copending U.S. patent application 749,810 with the exception that in the instant case the sectors of the drums 12 and 12' are rotatable about a fixed axis 11, i.e. the transfer drums 12 and 12' once adjusted for proper operation, do not shift in position laterally but rather remain in fixed lateral position with respect to the fixed axis D—D of building drum 39 and with respect to the severing means 25 and 25'. Furthermore, in accordance with the present invention each of the plies operated on by the pair of sectors of one of the drums 12 and 12' is identical to all of the other plies operated on by the same drum and is in all cases applied directly by such drum onto the building drum 39 without any intermediate transfer member. The ply Ra carried on sector 13a is therefore identical to ply Rb carried on sector 13b, while ply Ra' on sector 13a' is identical to ply Rb' on sector 13b'. The sectors 13a, 13b and thus also the plies carried by these sectors of transfer drum 12 slightly exceed in length those of the drum 12' and the breaker strip supporting surfaces of the sectors of drum 12 is located at a slightly shorter radius than the corresponding strip supporting surfaces of the sectors of drum 12' so as to account for the thickness of the first i.e. inner ply which is applied to the breaker building drum 39 by drum 12' prior to its arrival at the second axial station thereof, namely in registry with plane B—B.

Building of an annular breaker ply assembly consisting of a pair of superimposed annular breaker plies, for example Ra and Ra', is accomplished in the following manner: the breaker building drum 39 is placed in its first axial position thereof, i.e., in registry with plane A—A. It should be noted that the shifting means of the breaker building drum 39, namely the hydraulic or pneumatic jacks 157, 158, 157a, 158a and the drive means 16a, 16b, 16a', 16b' for rotating the drums 12 and 12', are suitably synchronized by well-known control means for permitting shifting of the breaker building drum 39 into or out of the positions in registry with drums 12 and 12' only when the respective one of these drums is in a position of rotation in which both of its sectors are angularly spaced from the surface of the breaker building drum 39, i.e. when, as illustrated in FIG. 1c, the breaker building drum 39 is in registry with the gap between the pair of sectors (e.g. sectors 13a' and 13b') of the respective transfer drum. The latter synchronization assures sufficient clearance between the drums 39 and 12 or 12', as the case may be, to permit axial shifting of the former with respect to the corresponding one of the latter.

With the breaker building drum 39 in its first position, i.e. in registry with drum 12', the magnetically attractable strips R and R' are preferably magnetically adhered to and supported on the sectors 13a, 13b and 13a', 13b' of the drums 12 and 12' respectively, in the same manner as described in the aforesaid copending U.S. patent application 749,810. The manner in which the continuous strip materials R and R' are severed on the transfer drums 12 and 12', respectively, and in which the severed strip portions Ra (drum 12) and Ra' (drum 12') are then transferred and applied to the breaker building drum 39 will now be described. With the breaker building drum 39 in its first position i.e. in registry with drum 12' the drum 39 is disengaged from its rotary drive means by deactuation of its electromagnetic clutch 153, while the axial shifting means, namely jacks 157, 158, 157a and 158a, all being in fully extended condition, maintain the drum 39 in proper alignment with respect to the plane A—A. At this time the sectors 13a' and 13b' of drum 12' occupy the position shown in FIG. 2b, i.e. a position in which the adjacent transverse edges of the sectors which are located at that time adjacent the severing means 25' are releasably locked together by releasable locking 78 (FIG. 4).

At this time also the sector 13b' is blocked by the solenoid locking device 70b'. With the sectors in the position illustrated in FIG. 2b, the adjacent transverse edges thereof which are in engagement with each other are so situated as to lie directly in the path of the rotary cutter blade of cutter means 25'. Cutter means 25' is then actuated to proceed in downward direction, severing the strip material R' along the inclined path of the cutter which path is parallel to the engaged transverse edges of the sectors 13a' and 13b'. Starting from this position, the solenoid 70b' is released to release sector 13b' and with the electromagnetic clutch 18a' in engaged condition, the drive motor 16a' of sector 13a' is energized for driving the latter in clockwise direction as viewed in FIG. 2b. Meanwhile, the electromagnetic clutch 18b' of sector 13b' is maintained in engaged condition so as to provide a driving connection between sector 13b' and its drive means 16b', the latter, however, not being energized at this time. As a result, however, of the speed reducer 19b', through which the sector 13b' is connected to its drive motor, the latter sector is effectively braked (so long as clutch 18b' remains engaged). Thus, rotational movement of sector 13a' results in the release of the releasable locking means 78, by overcoming the spring action of spring 31 thereof, permitting sector 13a' to be driven in clockwise direction with respect to the braked sector 13b'. The sectors thus separate at the previously engaged edges thereof. When the leading tip of the ply strip portion Ra' which overlies the leading tip of edge 190 (FIG. 2b) of sector 13a' comes in contact with the peripheral surface of the building drum 39, the latter, then disengaged from its drive means, is set in rotation by such contact so that the ply strip portion Ra' carried by the said sector is applied onto the surface of the building drum 39. When the leading edge 190 of sector 13a' comes in contact with the trailing edge 191 of sector 13b' and becomes releasably locked thereto by action of the corresponding releasable locking means 78 the electromagnetic clutch 18b' is disengaged thus releasing sector 13b' to rotational movement. The latter sector, now integral with sector 13a', is driven in rotation by the sector 13a' about the axis 11 so that while the severed strip portion Ra' on sector 13a' continues to be applied to the building drum 39 additional strip material R' is wound onto the surface of the now rotating sector 13b' until the now adjacent edges 190 and 191 reach the cutting position, i.e. the position in which they are in registry with the path of cutter means 25'. When this position is reached the sector 13a' is locked by the locking jack 70a'. The severing means 25' having previously been returned to its upper position, is once more actuated for its descending severing stroke so that a new strip portion Rb', this time located on the sector 13b' is severed from the continuous strip material R'.

The same procedure as described above is repeated with respect to the sector 13b' the next time it is desired to apply to the drum 39 an inner ply of breaker material. Before this is done, however, and with the sectors 13a' and 13b' juxtaposed with respect to their positions as illustrated in FIG. 2b. i.e. with drum 39 in registry with the "gap" of drum 12', formed by the space between the trailing edge 193 of sector 13a' and the leading edge 192 of sector 13b' similar to the "gap" shown in FIG. 2b between edge 190 of sector 13a' and edge 191 of sector 13b' (and with the sectors of drum 12 also in such rotational condition that the "gap" therebetween is facing the fixed axis D-D of building drum 39) the shifting means 41 is actuated to shift breaker building drum 39 which now has an inner ply of breaker material Ra' thereon, to the second position thereof i.e. in registry with transfer drum 12. The sectors 13a and 13b of drum 12 now cooperate with the building drum 39 in exactly the same manner as has just been described with respect to the drum 12'. In this manner there is now applied around the inner breaker ply Ra' on drum 39, an outer breaker ply Ra, severed, in the same manner as described above, from the continuous strip R of breaker material. An annular breaker is thus built up of an inner and an outer ply of breaker material the cords of which may form a crossing angle with respect to each other as a result of the different orientations of the strip supply means 1 and 1'.

During the previously described cycle of building the inner and outer breaker ply assembly on the drum 39 the tread transfer Unit C, for transporting and applying strips of tread material T, functions in the manner described in said copending U.S. patent application 740,-209 in such a way that at the end of the cycle of building the breaker ply assembly Ra, Ra', i.e., after an outer breaker ply has been applied to the building drum by the transfer drum 12 a tread support 141, loaded with a strip of tread material T is located on the ramp 143. When the transfer drum 12 has completed the application of an outer ply Ra onto the drum 39, the sectors 13a, 13b thereof are in the positions generally illustrated in FIG. 2b with respect to the drum 12' only with the sectors juxtaposed i.e. sector 13a where sector 13b' is shown and sector 13b where sector 13a' is shown. The building drum 39 is now in registry with a "gap" region of the transfer drum 12 so as to provide clearance between the drum 39 and the drum 12. The ramp 143 is now raised, by means of a hydraulic jack 38, toward and into engagement with the breaker assembly that has just been built up on the building drum 39.

With the leading edge of the strip of the tread material T on ramps 143 thus brought into engagement with the outer surface of the breaker assembly built up on drum 39, the latter, while still in its said second position, is rotated in a counterclockwise direction as viewed in FIG. 2b by engaging its electromagnetic clutch 153 and energizing its drive motor 151. With the tread support member 141 blocked against movement by a stop 185, the rotation of drum 39 as just described has the effect of driving the tread strip T off its support 141 in a manner to wind the strip around the breaker assembly built up on drum 39. After the breaker and tread are thus assembled into an assembly BT, the shifting means 41 is actuated once more, this time to shift the building drum into its third position, namely the position in which the building drum is located between the plane B—B and the pivoting turret 42, i.e. position in registry with plane Q—Q, a position in which it is kept temporarily fixed by the means 41.

With the turret 42 in a position in which its axis d—d coincides with the axis D—D of the breaker building drum 39, and with the transfer ring 50 in radially expanded condition thereof, the shifting means 49 and 49' of the latter are actuated so as to shift the transfer ring 50 along axis D—D until it surrounds and is in registry with the breaker building drum 39 at location Q—Q. Then, by suitably contracting the transfer ring 50 into engagement with the breaker-tread assembly BT on building drum 39 and by thereafter radially contracting the drum 39, all as described in the aforesaid copending U.S. patent application Ser. No. 717,786, the breaker-tread assembly BT is transferred to the ring 50. The ring 50 is then brought by axial translation along axis D—D, by its shifting means 49 and 49', to its initial retracted position on the pivoting turret 42 as shown in solid lines on FIG. 6c. The latter turret is rotated around its vertical axis 43 by actuation of the hydraulic or pneumatic jack 51 until its axis d—d coincides with the axis D'—D' of the carcass support drum 52 (FIG. 6a).

During the aforesaid cycling of the apparatus and prior to pivoting of the turret 42 in the manner just described, the operator will have placed a first stage carcass on the carcass support drum 52 and the latter will have been stretched, in the manner described in copending U.S. patent application Ser. No. 717,786, by the bead support disks which constitute drum 52 as the latter are moved away from each other in symmetry with the median plane E—E. After stretching of the cylindrical carcass C by the action of the carcass support disks, the applicator means 54 is actuated shifting the applicator device into the dotted line position thereof illustrated in FIG. 8. A predetermined quantity of solvent may be ejected from a main reservoir into the chambers 55, 55'. With the felt pads 56, 56' resting on the surface of the first stage carcass C the carcass support drum 52 is rotated by actuation of its drive means and the pads 56 and 56' which are now soaked with solvent, moisten the outer surface of the first stage carcass with solvent at the locations at which the breaker-tread assembly BT is to be applied. After completion of the coating operation, the applicator arms 66 and 66' are brought back to their rest position as illustrated in solid lines in FIG. 8 so as to be out of the way during the remaining portion of the cycle.

The transfer ring 50, carrying the completed breaker-tread assembly BT, is then shifted along axis D'—D' into the dotted line position of FIG. 6b, surrounding and in registry with the first stage carcass located on the carcass support drum 52. The conical rings 48 and 53 are then shifted, in symmetry with plane E—E along the same axis D'—D' toward each other and into engagement with the side wall regions of the first stage carcass. The rings 48 and 53 are thereafter shifted in unison axially with movement of the carcass bead supporting disks of carcass support means 52 toward the median plane E—E while pressure fluid is introduced into the chamber formed by the carcass support disks and the interior of the first stage carcass thereon. The moving together of the bead regions of the carcass in axial direction simultaneously with inflation of the carcass and inward axial movement of the conical sidewall engaging rings 48 and 53 together act to shape the carcass into toroidal shape. The periphery of carcass C thus moves into engagement with the surrounding breaker-tread assembly BT held at the interior of the contracted transfer ring 50. After the breaker-tread assembly is thus applied onto the shaped carcass, the transfer ring 50 is radially expanded and retracted toward its starting position adjacent the turret 42. Similarly, the sidewall shaping rings 48 and 53 are axially retracted to their initial positions adjacent the turret 42 and adjacent the carcass support frame 180, respectively. The completed second stage carcass may now be readily removed from the carcass support disks in the manner also described in the aforesaid copending U.S. patent application Ser. No. 717,786.

It will be understood by those skilled in the art that suitable conventional and electrical fluid circuits would be employed in the foregoing tire building machine to automatically regulate the various movements of the various parts within each of the units of the machine as well as to synchronize the operations of the various units of the machine with respect to one another thus making possible the completely automatic building of second-stage tire carcasses.

The apparatus according to the present invention is readily adaptable to different sizes of tire carcasses which it might be desired to build. Thus, it would be readily apparent that since the transfer drums 12 and 12′ are adjustable in position with respect to the axis D—D of the breaker building drum, the formed can be adjusted to suit various sized breaker building drum diameters. Similarly, the lengths of the sectors of the transfer drums may be readily varied by the addition or removal of readily applied or detached sector elements.

It will also be apparent that the relative arrangement of the units may be varied somewhat and still fall within the scope of the present invention. Thus, for example, it may be necessary in order to best suit the factory space available, to position the carcass support drum and its supporting structure along an axis D′—D′ which makes an angle other than 90° with the axis D—D without such modification departing from this invention.

It will be seen that the apparatus according to the present invention requires a minimum of factory space while being capable of fully automatic operation. Furthermore, the tire production rate is high since many of the operations are performed simultaneously rather than sequentially. A single operator has ready and convenient access, at one location, to the tread strip loading area, the second stage unloading area, and to the breaker and tread assembly area. Inner and outer breaker plies of different physical size and/or characteristics are readily assembled in accordance with the apparatus of the present invention, with the cords of one such ply forming a crossing angle with respect to the cords of the other ply. In addition, product uniformity is improved as a result of reducing the number of possible misalignments in the assembly of the tire components by maintaining fixed the axes of the transfer drums as well as of the breaker building drum and by the accurate alignment which is possible in accordance with the present invention between the breaker building drum and the respective one of the transfer drums, the continuous strip material applied to the transfer drums, and the tread applicator.

While particular embodiments of this invention have been shown and described, it will be obvious to those skilled in the art that various changes and modifications may be made without departing from this invention in its broader aspects, and it is, therefore, intended in the appended claims to cover all such changes and modifications as fall within the true spirit and scope of this invention.

Having thus described the invention, what is claimed as new and desired to be secured by Letters Patent of the United States is:

1. A tire building apparatus comprising:
a breaker building drum supported for rotation about and axial movement along a given axis fixed in space;
shifting means associated with said building drum for intermittently shifting the latter along said given axis between a first axially stationary position and a second axially stationary position spaced from said first position;
first applicator means located adjacent said first of said positions and cooperable with said drum when the latter is in said first position for applying a first breaker ply to the periphery of said drum; and
second applicator means located adjacent said second position and cooperable with said drum when the latter is in said second position for applying a second breaker ply around the first breaker ply.

2. The apparatus according to claim 1 wherein said shifting means is adapted to intermittently shift said drum also into and out of a third axially stationary position axially spaced from each of said pair of positions and said apparatus comprising transfer means cooperable with said building drum when the latter is in said third position thereof for removing the built-up breaker assembly therefrom.

3. The apparatus according to claim 2, further comprising third applicator means adjacent said second position of said drum but spaced from said second applicator means and cooperable with said drum when the latter is in said second position thereof for applying a strip of tread material around the pair of breaker plies.

4. The apparatus according to claim 2 wherein said first and second applicator means each comprises a rotary transfer drum having a surface portion extending over less than the full circumference thereof so as to form at the remainder of the circumference an axially extending gap.

5. The apparatus according to claim 4 wherein said gap of each of said drums extends generally axially the full width of the respective transfer drum.

6. The apparatus according to claim 4 wherein said breaker building drum has a radially expansible and contractible surface portion, said apparatus further comprising support means for supporting both of said transfer drums for rotation about a common second axis parallel to and spaced a given fixed distance from said first mentioned axis, said given fixed distance between said first and second axes being only slightly greater than the combined radii of said breaker building drum surface portion when the latter is in fully expanded condition and of said surface portion of one of said transfer drums.

7. The apparatus according to claim 6 wherein said surface portion of the other of said transfer drums has a radius only slightly smaller than the radius of said surface portion of said one transfer drum.

8. The apparatus according to claim 4, further comprising rotary drive means associated with said transfer drums and adapted to rotate each of said transfer drums into and out of a given angular condition in which its respective gap faces said first mentioned axis, said building drum being shiftable into and out of said first and second positions thereof, respectively, when the transfer drum located adjacent such position of said building drum is in said given angular condition in which the gap thereof is in registry with said building drum.

9. The apparatus according to claim 1, further comprising:
first supply means for supplying a first continuous strip of breaker material to said first applicator means;
second supply means for supplying a second continuous strip of breaker material to said second applicator means;
and first and second severing means associated, respectively, with said first and second applicator means for severing the respective strip materials thereon into strip portions having lengths corresponding to the inner and outer breaker plies, respectively.

10. The tire building apparatus according to claim 1, wherein said first applicator means comprises a first transfer drum supported for rotation about a second axis parallel to and spaced a fixed distance from said first mentioned axis, said second applicator means comprising a second transfer drum coaxial with but axially spaced from said first transfer drum.

11. The apparatus according to claim 10 wherein each of said transfer drums comprises a first surface portion extending over less than the full circumference thereof and adapted to tangentially engage said building drum during rotation of the respective transfer drum when said building drum is in said first and second positions thereof respectively, and each of said transfer drums defining a gap portion extending over the remainder of the circumference thereof.

12. The apparatus according to claim 11 further comprising third applicator means located adjacent said second position of said building drum for applying a strip of tread material to the periphery of said building drum when the latter is in said second position thereof, said third applicator means comprising tread support means movable into and out of tangential engagement with said building drum.

13. The apparatus according to claim 2 further comprising carcass support means spaced from said third position of said building drum and adapted to support a first stage carcass thereon, said transfer means including a breaker transfer portion and actuating means associated with said breaker transfer portion for shifting the latter between a pair of positions in one of which said breaker transfer portion is in registry with said third position of said building drum and in the other of which said transfer portion is in registry with said carcass support means.

14. The apparatus according to claim 13 wherein said transfer portion comprises an expansible and contractible transfer ring, said ring surrounding a breaker built up on said building drum when the latter is in said third position thereof and said transfer ring is in said one position thereof, and said building drum and said transfer ring cooperating in said last mentioned positions thereof, respectively, to transfer a build up breaker-tread assembly from the periphery of said drum to the interior of said ring.

15. The apparatus according to claim 13 wherein said carcass support means is spaced from said first mentioned axis on a third axis transverse to said first mentioned axis, said transfer means further comprising pivot means for supporting said transfer portion for pivotal movement between positions in which the latter is in alignment with said first mentioned axis of said third axis, respectively.

16. The apparatus according to claim 15 wherein said first mentioned and said third axes together define a substantially horizontal plane, said pivot means comprising a turret member and means pivotally supporting said turret member for turning movement about a vertical axis passing through the point of intersection of said first mentioned and said third axes.

17. The apparatus according to claim 16, wherein said first and third axes are at substantially right angles to each other.

18. The apparatus according to claim 16 wherein said transfer portion comprises a transfer ring, and means on said turret for supporting said transfer ring for shifting movement along its own axis between a position adjacent said turret and a position spaced from said turret, said spaced position being chosen such as to be in registry with said third position of said building drum when said axes of said ring and said building drum coincide, and to be in registry with the position of said carcass support means when said axes of said ring and said carcass support means coincide.

19. The apparatus according to claim 16 further comprising a pair of sidewall shaping ring members, one of said ring members being carried by said turret coaxially with said transfer ring and the other of said ring members being carried by said carcass support means; and means provided on said turret and on said carcass support means for shifting said ring members toward and away from each other at opposite sides of a carcass supported on said carcass support means when said turret is in a position of rotation in which the axes of said transfer ring and of said carcass support means coincide.

20. The apparatus according to claim 13 further comprising coating means cooperating with said carcass support means for applying a coating to the surface of a first stage carcass positioned on said carcass support means.

21. The apparatus according to claim 1 wherein said breaker building drum is radially expansible and contractible and including means associated with said building drum for radially expanding and contracting the latter.

22. The apparatus according to claim 21 wherein the strip material is magnetizable, said first applicator means, said second applicator means and said breaker building drum each including magnet means for adhering portions of the strip material thereto.

23. The apparatus according to claim 1 wherein each of said first and second applicator means includes a transfer drum comprising a pair of relatively rotatable segment portions of a common cylinder, said pair of segment portions of one of said drums being substantially identical and together extending over less than the entire circumference of such drum and each of said segment portions having a surface portion corresponding in size and shape to a ply of breaker material to be built up on said building drum.

24. The apparatus according to claim 1 wherein each of said applicator means comprises a transfer drum, said drums being supported for rotation about a common axis fixed in space and said axis of said breaker building drum being fixed in space a given distance from said common axis, said given distance being such that surface portions of said transfer drums and of said building drum will cooperate to transfer breaker material from the former to the latter in the respective positions of said building drum.

25. The apparatus according to claim 12 wherein said tread support means is movable into tangential engagement with said breaker building drum for applying a layer of tread material around a built-up breaker thereon only when said transfer drum of said second applicator means is in a rotational position in which said gap portion thereof faces toward said breaker building drum.

References Cited
UNITED STATES PATENTS

| | | | |
|---|---|---|---|
| 1,748,299 | 2/1930 | Maynard | 156—394 |
| 1,938,787 | 12/1933 | Abbott | 156—405 |
| 2,814,330 | 11/1957 | Vanzo et al. | 156—394X |
| 2,988,131 | 6/1961 | Frohlich et al. | 156—405 |
| 3,038,524 | 6/1962 | Bosomworth | 156—405 |
| 3,151,013 | 9/1962 | Nebout | 156—405 |
| 3,157,542 | 11/1964 | Trevaskis | 156—396UX |

BENJAMIN A. BORCHELT, Primary Examiner

S. C. BENTLEY, Assistant Examiner

U.S. Cl. X.R.

156—406